UNITED STATES PATENT OFFICE.

FREDERICK PROESCHER, OF SIOUX CITY, IOWA.

ARTIFICIAL CULTIVATION OF BRONCHIO-PNEUMONIA VIRUS FOR USE IN THE TREATMENT OF SWINE.

1,391,579.

Specification of Letters Patent. Patented Sept. 20, 1921.

No Drawing. Application filed July 15, 1920. Serial No. 396,476.

*To all whom it may concern:*

Be it known that I, FREDERICK PROESCHER, a citizen of the United States, residing at Sioux City, in the county of Woodbury and State of Iowa, have invented a new and useful Improvement in the Artificial Cultivation of Bronchio-Pneumonia Virus for Use in the Treatment of Swine, of which the following is a full, clear, and exact description.

My invention has relation to the production of an artificial pure culture of bronchio-pneumonia virus for use in the treatment of swine, and is designed to provide a virus of this nature which may be used for the production of serum or for active immunization in the form of an attenuated vaccin or killed artificial culture.

The term "hog cholera," prior to my discoveries, was applied generally to a highly contagious disease of swine, caused by a filterable virus. The lesions produced by the virus varied very greatly. In some cases, a few barely visible hemmorrhages are present in the lymph glands, lungs and kidneys, and sometimes, but not always, very peculiar, so-called, "button ulcers" were seen in the large intestine. In other cases, the lumph glands are greatly swollen and deeply congested combined with bronchio-pneumonia, ulcerative process in the small and large intestines, conjunctivitis, rhinitis and keratitis. The discrepancies in the pathological lesions were attributed to the action of certain secondary invaders, viz., *Bac. suisepticus* and *suipestifer*, and other members of the paratyphoid group, which were sometimes, but not always, found in the affected organs with the filterable virus.

I have discovered, through extensive field and experimental investigations, that besides the filterable hog cholera virus, another filterable virus exists which is responsible for the bronchio-pneumonia and the other above mentioned lesions which had theretofore been confused with hog cholera.

Since the *Bac. suipestifer* and, in general, the micro-organisms of the paratyphoid group, and the *Bac. suisepticus* are not filterable, these were discarded as the possible causative agents of the bronchio-pneumonia and the diphtheroid process in the intestines.

The disease caused by the newly discovered filterable virus will be designated as "contagious bronchio-pneumonia," since it is highly contagious, and the most predominant lesion is bronchio-pneumonia. The virus can be transmitted to lower laboratory animals, such as rabbits and guinea pigs.

Briefly, the microscopical lesions of a pure hog cholera infection are hemorrhages in the various organs and lymph glands, and sometimes peculiar button ulcers occur in the large intestine. Microscopically, there are septic emboli (caused by the hog choleracoccus) in the small capillary vessels, especially in the kidneys (embolic capillary glomerulo-nephritis) lymph glands and skin, with parenchymatous hemorrhages, but without inflammatory changes, combined with more or less pronounced endangitis. The button ulcers are the result of an endangitis of the capillary vessels of the muscularis mucosa of the large intestines.

The microscopical lesion encountered in contagious bronchio-pneumonia are a localized or diffuse, simple or hemorrhagic, bronchio-pneumonia, diphtheroid processes in the stomach, the small and large intestines (suppurative or ulcerative follicular lymphadenitis, or diffuse superficial diphtheroid necrosis of the mucous membrane of the lower ileum, cæcum, large intestines and rectum). Also a more or less pronounced systemic lymphadenitis, simple or hemorrhagic, spleen tumor, parenchymatous or hemorrhagic nephritis, hepatitis and cystitis, and hemorrhages in the serous membranes occur. The microscopical changes are enormous congestion of the capillary vessels, combined with hemorrhages and inflammatory processes, plasma-cell infiltration of the lymph glands and diffuse or localized interstitial and tubular nephritis with lymphocyte and plasma-cell infiltration. In contrast to hog cholera, embolic changes are almost entirely absent. The central nervous system may also be involved and a diffuse encephalitis and extensive perivascular infiltration of the capillary vessels of the gray matter may be noted. In some cases, diffuse parenchymatous keratitis with corneal ulcers leading to panophthalmia was observed. The virus of the contagious bronchio-pneumonia is mainly found in the lymphatic spaces and connective tissue.

In short, hog cholera is a blood infection and contagious broncho-pneumonia is a lymphatic infection. They may occur either as pure or mixed infections. The bronchio-pneumonia virus can be made visible in the primary lesions with strong basic anilin dyes, preferably methylene azure. The broncho-pneumonia micro-organisms appear in stained sections or smears in form of a diplococcus or very short bacillus, and I have designated them micrococcus of contagious bronchio-pneumonia. I have also discovered that they can be artificially cultivated in a suitable medium, and that for this purpose the culture media and method of culture described in my Patent No. 1,334,318, dated March 23, 1920, relating specifically to the artificial cultivation of the hog cholera virus, may be employed. In said patent (to which reference may be had for a more complete description), I describe several different media, each of which comprises a mixture of animal tissue broths containing a dissolved hemoglobin, and which are well adapted for the cultivation of the newly discovered virus. I do not, however, limit myself to the use of the media described in said patent, as such media are typical only and other culture media possessing similar characteristics and brought to the proper ion-con-centration may be employed. I also desire it understood that the methods of making the culture media, with the proportions given, as described in said patent, may be varied, as many modifications thereof will readily occur to bacteriologists skilled in this art.

The artificial virus may be used for the production of an anti-bronchio-pneumonia serum or for the active immunization (in the form of an artificial attenuated vaccin or a killed artificial culture), or for simultaneous immunization, by methods similar to those employed in the use of hog cholorea virus.

In stead of using the whole culture, the virus may be centrifuged therefrom, and the sediment taken up with a sodium chlorid solution of about .85%, and the emulsified sediment used for injection.

My discovery of the new virus described and that it can be artificially cultivated, promises to be of great practical importance, as it affords a proper method of treatment for a disease of wide prevalence in swine and which has heretofore been large confused with hog cholera and improperly treated.

I claim:

1. As a new product, an artificial pure culture of bronchio-pneumonia virus for the treatment of swine.

2. As a new product, an artificial pure culture of bronchio-pneumonia virus of swine in a nutrient medium containing dissolved hemoglobin.

3. As a new product, an attenuated artificial pure culture of bronchio-pneumonia virus of swine.

4. As a new product, an attenuated artificial pure culture of the virus or infective organisms causative of bronchio-pneumonia of swine in a culture medium containing dissolved hemoglobin.

5. As a new product, an artificial pure culture of the virus or infective organisms causative of bronchio-pneumonia of swine in a nutrient medium containing a mixture of animal tissue broths containing a dissolved hemoglobin.

6. The method of cultivating bronchio-pneumonia virus of swine, which consists in growing the same in a nutrient medium containing dissolved hemoglobin.

7. The method of cultivating bronchio-pneumonia virus of swine, which consists in growing the same in a nutrient medium containing a mixture of animal tissue broths and dissolved hemoglobin.

8. The method of cultivating bronchio-pneumonia virus of swine, which consists in growing the same in a nutrient medium containing a bouillon made from animal tissue and containing hemolized blood.

In testimony whereof, I have hereunto set my hand.

FREDERICK PROESCHER.